US008064821B2

(12) United States Patent
Roland et al.

(10) Patent No.: US 8,064,821 B2
(45) Date of Patent: Nov. 22, 2011

(54) MOBILE TELEPHONE NETWORK FOR COMMUNICATION BETWEEN TWO COMMUNICATION SETS

(75) Inventors: Alain Roland, Quincy sous Senart (FR); Thierry Roland, Quincy sous Senart (FR); Mohamed-Tahar Zaghdoud, Maisons-Alfort (FR)

(73) Assignee: E-Blink, Boussy Saint Antoine (FR)

( * ) Notice: Subject to any disclaimer, the term of this patent is extended or adjusted under 35 U.S.C. 154(b) by 774 days.

(21) Appl. No.: 10/579,474

(22) PCT Filed: Nov. 17, 2004

(86) PCT No.: PCT/FR2004/002932
§ 371 (c)(1),
(2), (4) Date: Mar. 7, 2007

(87) PCT Pub. No.: WO2005/051017
PCT Pub. Date: Jun. 2, 2005

(65) Prior Publication Data
US 2007/0243824 A1  Oct. 18, 2007

(30) Foreign Application Priority Data

Nov. 17, 2003 (FR) .................................. 03 13391

(51) Int. Cl.
*H04B 3/36* (2006.01)
(52) U.S. Cl. ........... 455/7; 455/13.1; 455/15; 455/552.1

(58) Field of Classification Search ............. 455/7, 13.4,
455/11.1, 522, 450, 13.3, 562.1, 575.5, 101,
455/435.2, 13.1, 435, 427, 12.1, 435.1, 452.2,
455/557, 556.1, 41.1, 41.2, 455, 445, 561,
455/552.1
See application file for complete search history.

(56) References Cited

U.S. PATENT DOCUMENTS

| 4,827,395 | A | * | 5/1989 | Anders et al. ..................... 700/9 |
| 5,513,176 | A | | 4/1996 | Dean et al. |
| 5,533,011 | A | | 7/1996 | Dean et al. |
| 5,602,834 | A | | 2/1997 | Dean et al. |
| 5,768,268 | A | | 6/1998 | Kline et al. |
| 6,072,994 | A | | 6/2000 | Phillips et al. |
| 6,389,059 | B1 | | 5/2002 | Smith et al. |
| 6,483,470 | B1 | * | 11/2002 | Hohnstein et al. ............ 343/721 |
| 6,640,110 | B1 | | 10/2003 | Shapira et al. |
| 7,010,325 | B1 | * | 3/2006 | Oh ................................ 455/557 |
| 7,072,611 | B2 | * | 7/2006 | Shapira ........................... 455/7 |
| 7,123,911 | B1 | * | 10/2006 | Ngan ......................... 455/435.2 |
| 7,443,805 | B1 | * | 10/2008 | Bynum ......................... 370/254 |
| 2001/0011009 | A1 | | 8/2001 | Harada et al. |
| 2001/0031624 | A1 | * | 10/2001 | Schmutz ....................... 455/13.4 |
| 2002/0028655 | A1 | | 3/2002 | Rosener et al. |
| 2002/0072375 | A1 | * | 6/2002 | Huslig .......................... 455/455 |

(Continued)

FOREIGN PATENT DOCUMENTS

JP   59-154827   9/1984

*Primary Examiner* — Tan Trinh
(74) *Attorney, Agent, or Firm* — Leydig, Voit & Mayer, Ltd.

(57) ABSTRACT

The invention relates to a local communication network between a mobile telephone and a fixed-line telephone through a relay antenna and a connection for data transmission, connecting the antenna to a fixed radio-frequency station. The transmission connection is a wireless transmission connection at a radio frequency.

20 Claims, 7 Drawing Sheets

U.S. PATENT DOCUMENTS

| | | |
|---|---|---|
| 2003/0027597 A1 | 2/2003 | LaGrotta et al. |
| 2003/0040342 A1* | 2/2003 | Coan et al. .................... 455/571 |
| 2003/0140256 A1* | 7/2003 | Hauenstein et al. ........... 713/201 |
| 2003/0232595 A1* | 12/2003 | Baker et al. ................... 455/11.1 |
| 2004/0048596 A1* | 3/2004 | Wyrzykowska et al. ...... 455/403 |
| 2004/0077345 A1* | 4/2004 | Turner et al. .................. 455/423 |
| 2004/0145849 A1* | 7/2004 | Chang et al. ................... 361/120 |
| 2005/0085267 A1* | 4/2005 | Lemson et al. ............. 455/562.1 |
| 2005/0176368 A1* | 8/2005 | Young et al. .................. 455/11.1 |
| 2005/0221774 A1* | 10/2005 | Ceresoli et al. ............. 455/152.1 |
| 2005/0256963 A1* | 11/2005 | Proctor, Jr. et al. ........... 709/230 |
| 2009/0325479 A1* | 12/2009 | Chakrabarti et al. .............. 455/7 |

* cited by examiner

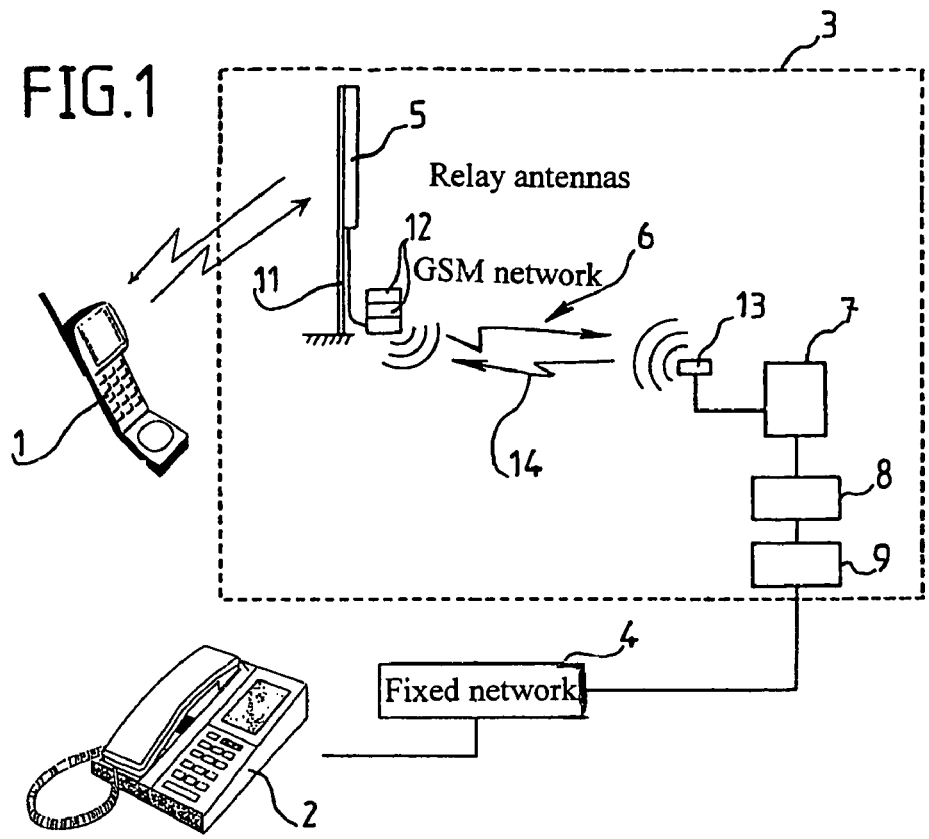
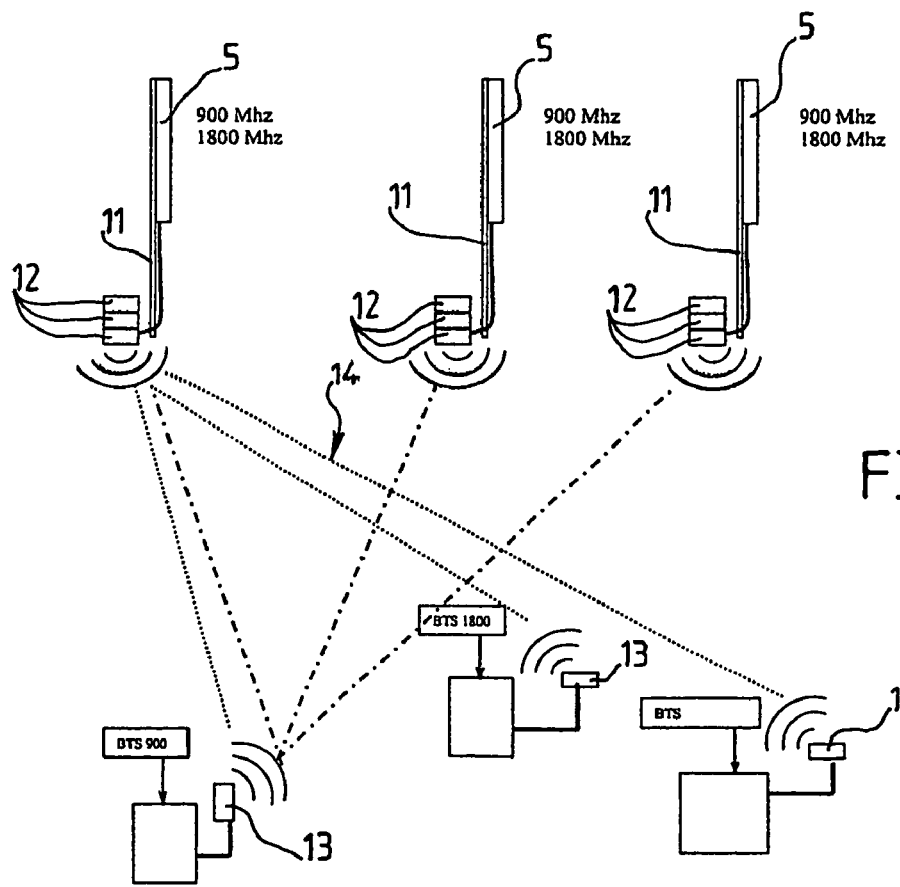

MOBILE TELEPHONE NETWORK FOR COMMUNICATION BETWEEN TWO COMMUNICATION SETS

FIELD OF THE INVENTION

The invention concerns a local communications network between a mobile station, such as a mobile telephone, and a fixed station, especially a fixed-line telephone, through a relay antenna and a data transmission link.

BACKGROUND

In known systems of this type coaxial cables are used as the data transmission link. The use of coaxial cables has a major problem in that construction of the installation is subject to strict constraints which entail, in general, the deployment of a group of receivers for the placement of the coaxial cables and an operation test. In addition, testing a fixed station antenna necessitates the use of highly expensive materials which are difficult to transport. These known systems are furthermore subject to other kinds of constraints having to do with the physical installation of a fixed set with respect to the antenna which must be within a 30-meter perimeter and which depends on the power source as well as the presence of carriers in the area where the system is installed. As a result, known systems, especially owing to the use of coaxial cables, are difficult to put into operation and costly.

SUMMARY

The purpose of the invention is to propose a system which allows the problems of known systems, just described, to be eliminated.

In order to attain this objective, the local communications system according to the invention includes a wireless data transmission link between the antenna and the fixed radio frequency station.

BRIEF DESCRIPTION OF DRAWINGS

The invention will be better understood and other purposes, characteristics, details, and advantages of it will be seen more clearly from the following explanatory description in combination with the appended schematic drawings which are submitted exclusively by way of illustrating one mode of realization of the invention and in which:

FIG. 1 shows a general schematic for a communications system between a mobile telephone and a fixed-line telephone through a mobile telephone network according to the invention.

FIG. 8 is a schematic drawing of a mobile telephone network consisting of three relay antennas capable of functioning in three different transmission bands.

DETAILED DESCRIPTION

Figure 2:
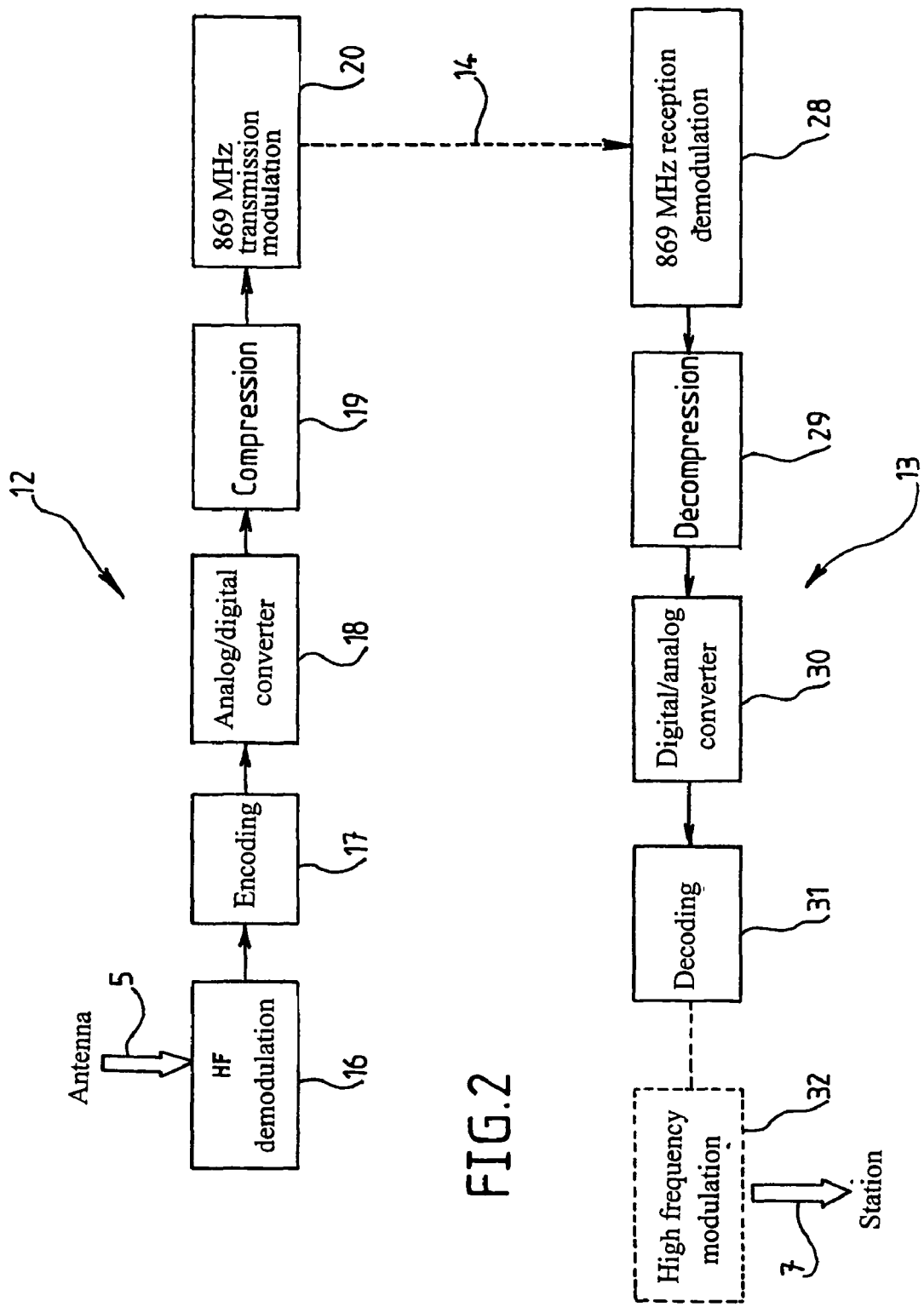
FIG. 2 is a functional schematic which illustrates the structure of the link device indicated by 6 in FIG. 1 of the mobile telephone network according to the invention.

The invention is described below as applied to a communications system between a mobile telephone 1 and a fixed-line telephone 2 through a mobile telephony network usually called GSM (Global System Mobile) 3 and the fixed network 4.

Inside the GSM mobile telephony network 3, communication goes from a relay antenna 5 for communicating with the mobile telephone 1 by means of a data transmission link 6 to a fixed assembly consisting of a radiocommunication station 7, which is a base transmission system usually referred to as BTS (Base Transceiver System), a base control station 8 usually referred to as a BSC (Base Station Controller) and a communications center 9 called MSC (Mobile Switching Center). Of course, if the communication goes from the fixed-line telephone 2 to the mobile telephone 1, the signals flow in the opposite direction.

Figure 6:
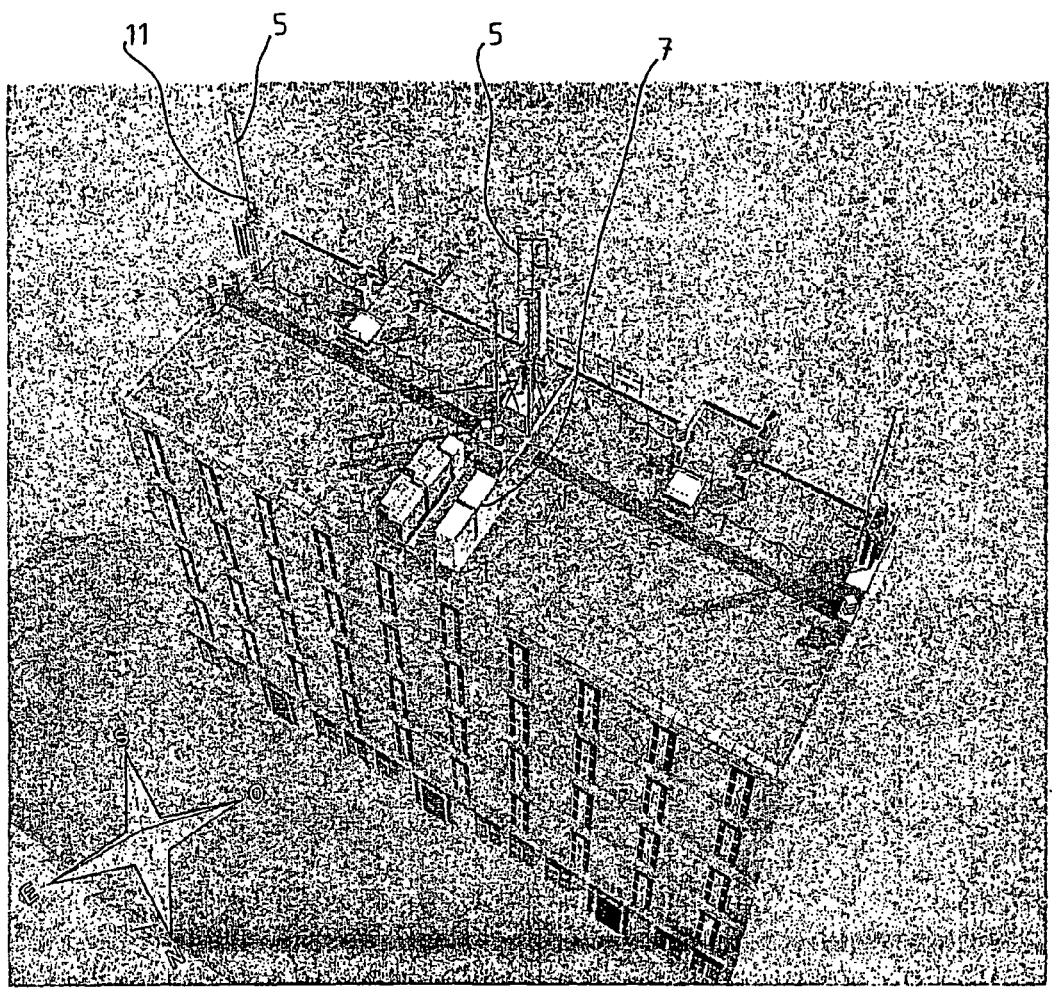
FIG. 6 is an elevation of a building on which a network according to the invention has been installed.
Figure 7:
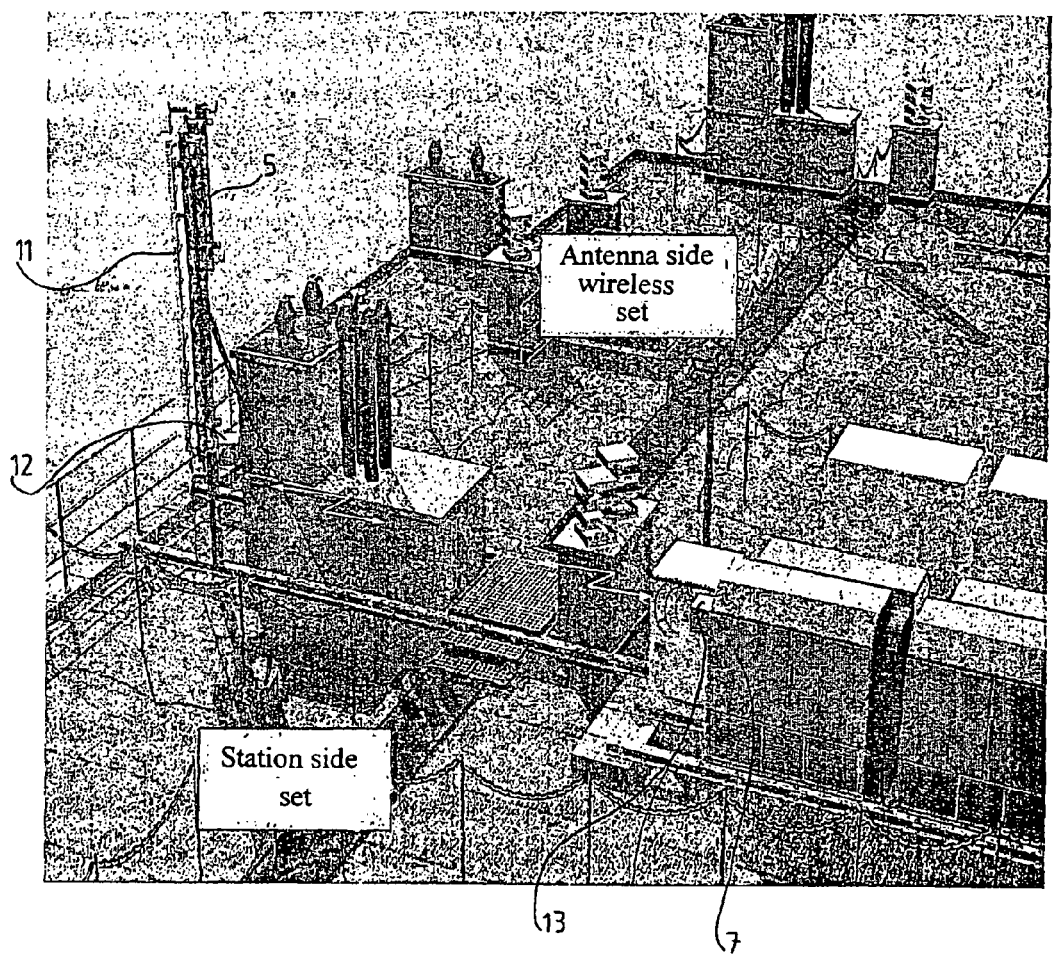
FIG. 7 is an elevation showing a part of FIG. 6 on a larger scale.

The relay antenna 5 may be of the multiband type, for example single band, dual-band, or tri-band and receive and transmit frequency bands or channels of 900, 1800, or 2200 MHz. The antenna is supported by a mast 11 built for example on the roof of a building as shown in FIGS. 6 and 7.

In conformity with the invention, the link between the antenna 5 and the radiocommunication station 7 is realized in the form of a radio frequency link. The wireless transmission takes place between an electronic device built at the base of the antenna mast 11, enclosed in a housing 12 and an electronic equipment device enclosed in a housing 13 linked to the communications station 7. If the antenna is a multiband type, a housing 12 is built for each band. One station is provided for each frequency band. The antenna housing 12 and station housing 13 are equipped with means of transmitting and receiving the signals to be transmitted. The specific transmission route of wireless signals is indicated by 14.

Referring to FIG. 2, it may be seen that, on the antenna 5 side, enclosed in the antenna housing 12, the radio frequency link 6 includes, in succession, starting from the antenna, a high frequency demodulation module 16, an encoding module 17, an analog/digital converter 18, a modulation and broadcast module 20, which broadcasts or receives the wireless signals on the transmission channel 14.

Figure 3:
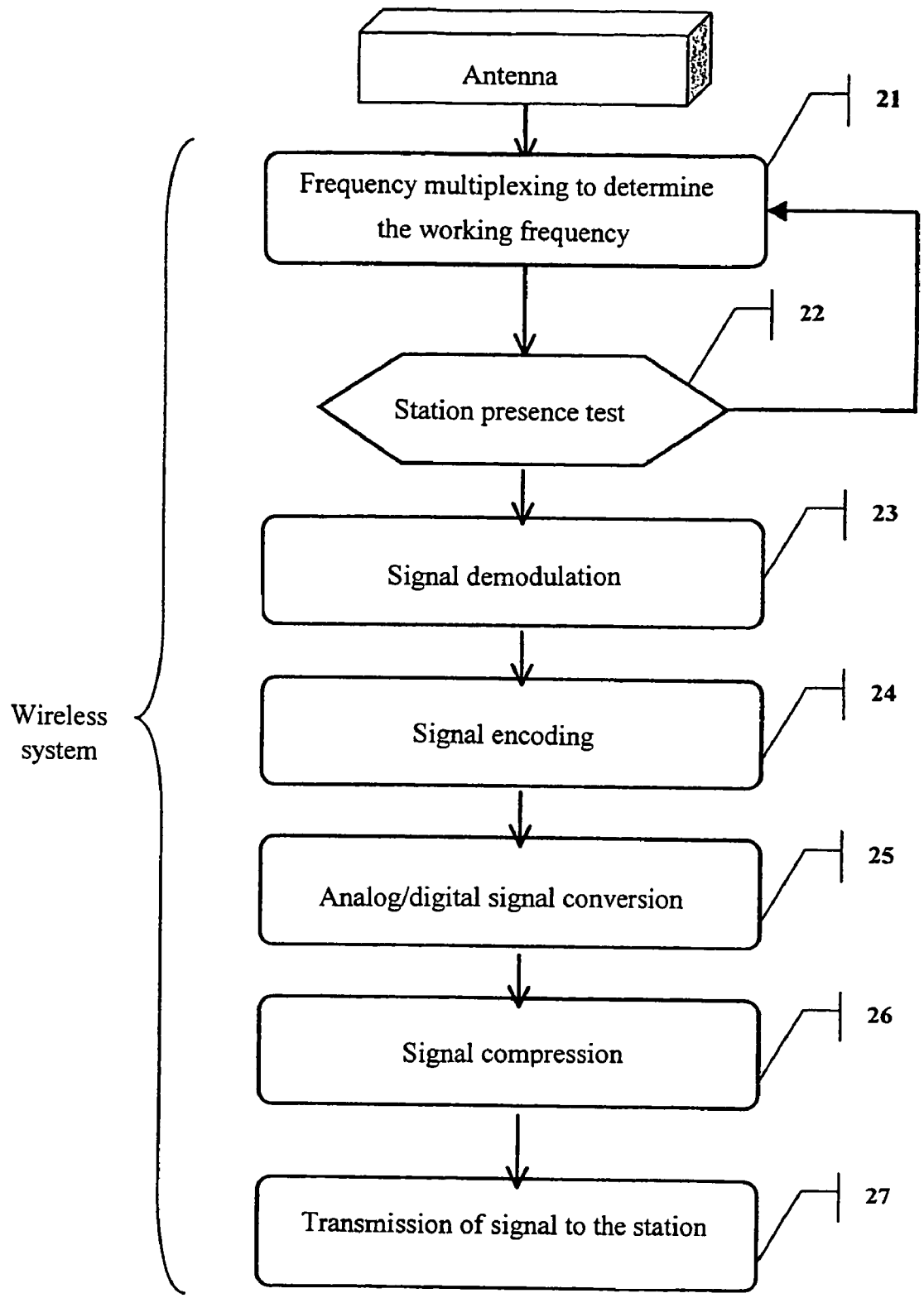
FIG. 3 is a flow chart of the communications function between the antenna and the mobile telephone network station according to the invention.
Figure 5:
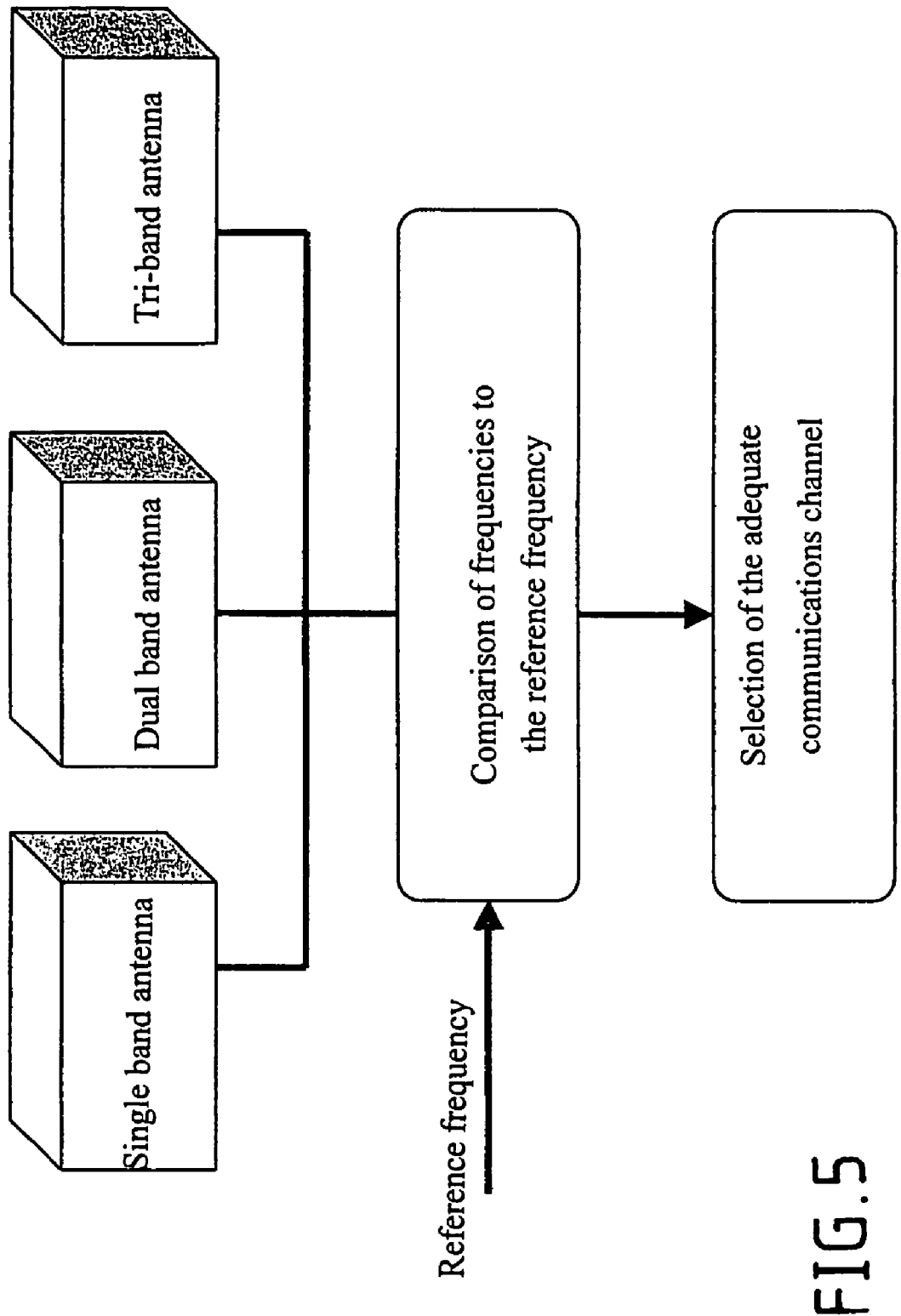
FIG. 5 is a flow chart of the multiplexing function between the various telephone network operating frequencies.

The modules just mentioned allow the operations indicated on the FIG. 3 flowchart. The multiplexing and demodulation module 16 has the purpose of ensuring the frequency multiplexing for a station 21 to identify the operation frequency, that is, the frequency band in which the signals arrive at the antenna or are broadcast by it. To that end, the multiplexing module is equipped with a reference frequency source, as may be seen in FIG. 5, which furnishes the frequencies corresponding to the antenna transmission bands. The multiplexing module identifies the frequency by comparing input signal frequency and the appropriate reference frequencies. If the GSM antenna 5 uses three frequency channel bands of 900 MHz, 1800 MHz, and 2200 MHz, the input signal will be compared first to the 900 MHz reference signal, then to that of 1800 MHz, and finally to the 2200 MHz signal. This multiplexing is done before any signal manipulation.

In conformity with FIG. 3, after multiplexing, in a stage 22, a test of the presence of a corresponding station is carried out. Its purpose is to ensure that the GSM network has a station 7 which can function at the frequency of the signals received. More precisely, at operation 22, a response test to this frequency is carried out on the radio station 7 side, consisting for example of a broadcast followed by listening at that frequency. In the absence of a response, it searches the next frequency, returning to step 21 to thus establish the conditions for another communication on another frequency channel.

If there is a positive reaction indicating the presence of a communicating station 7 at the frequency identified, the communication between the antenna and the station is established. The high-frequency analog signal received from the antenna is then demodulated at step 23 to a low-frequency level. The signal is demodulated to eliminate the modulation signal or carrier, which is the high-frequency component of the signal.

At the following decoding operation 24, the signal is sampled. In order to avoid undesirable phenomena resulting from the conventional Varicap type diode on which the modulation is superimposed, causing a frequency gap of −Fm or +Fm for logic "0" or "1," respectively, with the risk that the locked loop has the tendency to catch up with the modulation gap, in the case of the invention these levels are advantageously separated into a well defined "0" or "1" alternation so that the mean value of the modulating signal is null. In this way, whatever the content of the modulation, the carrier frequency does not vary.

Then comes the analog-digital conversion at operation 25. During the conversion, the low-frequency component, which presents the useful signal and is the result of the demodulation operation, is converted to digital. The analog-digital conversion is clocked for sampling frequency which is equal to or higher than twice the useful signal frequency.

In the subsequent signal compression operation, the binary stream received is separated into packets in conformity with the GSM network standards. These packets are compressed before being sent to the station 7. Data compression ensures a reduction of packet size, which allows the broadcast/receiving rate imposed by the GSM standard to be respected. At operation 27 the packets are transmitted by the wireless broadcast module 20 on an appropriate frequency band which could consist of a range of frequencies, for example from 400 MHz to 18 GHz. This relatively wide range allows an advantageous wireless transmission channel to be chosen, for economic or technical reasons. For example, by transmitting on an 869 MHz frequency band, there is the advantage of using a frequency band which is public in France and whose use is free of charge.

The signal thus transmitted by the modulation and transmission module 20 is received by a demodulation/receiver module 28 which is part of the radio-frequency station 7 housing 13. Then the signal received passes successively through the decompression modules 29, the digital/analog converter 30, a decoding module 31, and an optional high-frequency modulation module 32, finally reaching the station 7.

Figure 4:
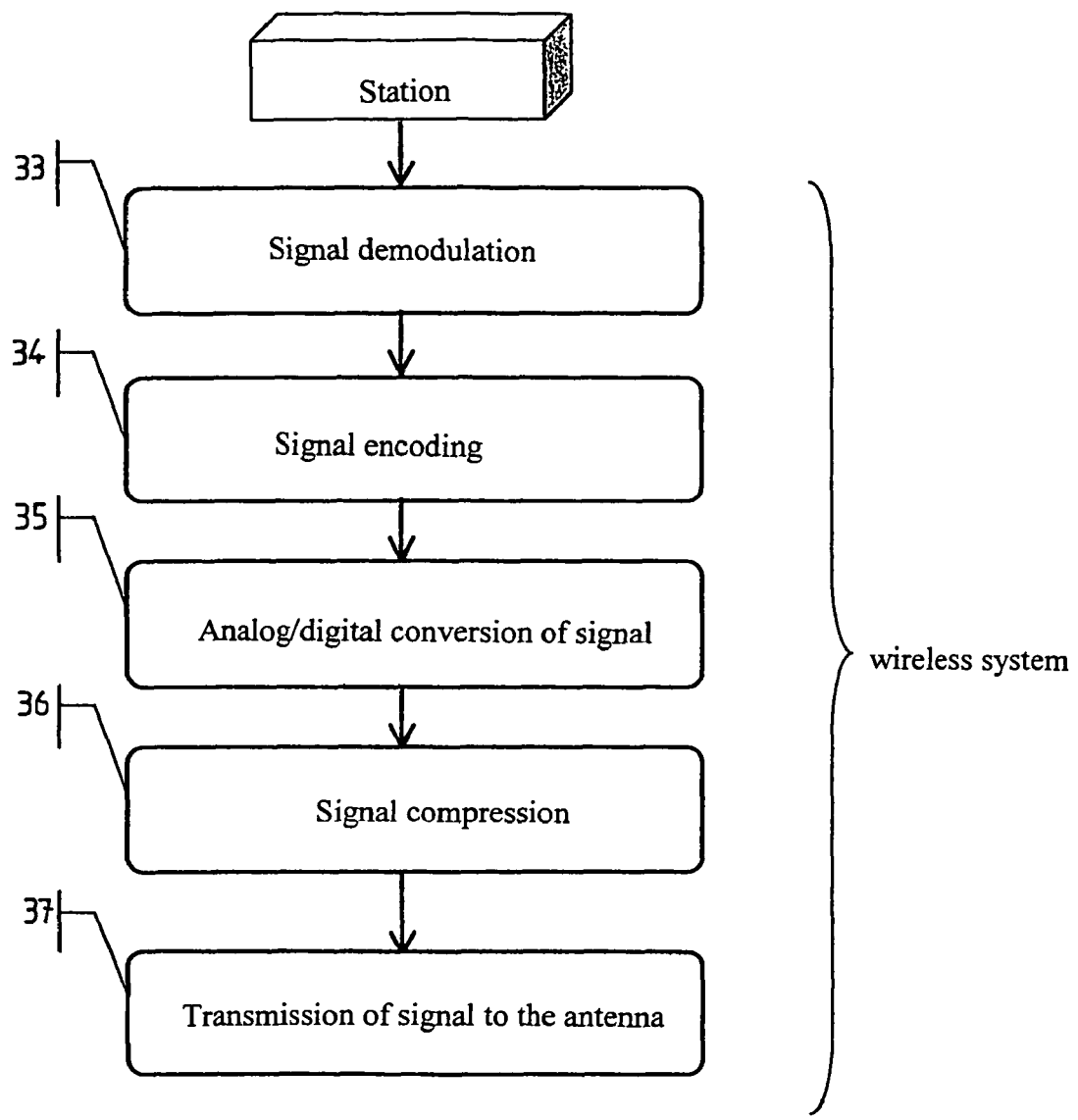
FIG. 4 is a flow chart of the communications function between the station and the mobile telephone network antenna according to the invention.

The description of the invention was made taking as an example the establishment of communication in the antenna-station direction. Of course, the process of establishing communication in the opposite direction, that is in the station-antenna direction, corresponds to that which has just been described and is illustrated in FIG. 4, and indicates a succession of operations beginning at the station 7, that is, the operations of signal demodulation 33, signal coding 34, analog/digital conversion 33, signal compression 34, and signal transmission to the antenna, carried out respectively by the modulation 32, decoding 31, conversion 30, decompression 29, and demodulation 28 modules.

FIGS. 6 and 7, which are elevations of a building in which the roof carries three relay antennas 5 such as those shown in FIG. 1 and the appropriate electronic equipment, illustrate the advantage of wireless links over the coaxial cables hitherto used. These figures illustrate not only the savings that the suppression of cables allows, but also that, owing to the fact that the space between antennas and stations can be greater, the invention allows placement of station boxes in advantageous locations. In the case of the invention, the installation conditions do not dictate the placement of the boxes, rather the locations may be chosen freely as a function of other aspects, for example those determined by the architecture of the building. In the case of the invention, the distance between the GSM antennas and the radio stations may be 10 to 500 m according to the placement of the station vis-a-vis the antennas. The assured range is a function of the frequency band used and the power allowed. For example, for an 869 MHz band, the range of the system is on the order of 400 m. By comparison, in known coaxial cable systems, the station must be located within 30 m of the antenna.

In addition, another advantage of the invention is that the wireless link electronic equipment allows integration of certain radio station functions, such as signal amplification or attenuation, which offers the possibility of lightening the internal structure of the radio stations and thus reducing their weight, currently on the order of 500 kg, which represents a strong constraint on their placement on site during installation.

FIG. 8 illustrates in particular the advantage that the invention brings. In fact, the system represented has three multi-frequency antennas, for example of 900 MHz, 1800 MHz, and 2200 MHz, designed to cooperate with three radio frequency stations 7 capable of functioning respectively at 900 MHz, 1800 MHz, and 2200 MHz. It may be ascertained that the use of wireless connections between the antennas and the stations allows each antenna to be made to cooperate easily with each of the stations, which implies the possible presence of nine links. These links can be realized easily in the form of wireless links, but would be problematic if one had to realize them according to the current technique of coaxial cables.

The invention claimed is:

1. A communications network providing communication between a mobile station and a stationary station, the communications network comprising:
a relay antenna providing a first wireless link with the mobile station and dedicated to a Base Transceiver System (BTS) station as the stationary station; and
a second wireless link which links the relay antenna to the BTS station to which the relay antenna is dedicated, wherein
the second wireless link includes, at the relay antenna, a demodulator demodulating high frequency signals received at the relay antenna from the mobile station, removing the carrier from the high frequency signals that are received at the relay antenna, and producing low frequency signals that are transmitted to the BTS station on the second wireless link.

2. The communications network in accordance with claim 1, wherein the first wireless link includes means for transmitting and receiving signals at selectable frequencies in a range from 400 MHz to 18 GHz.

3. The communications network in accordance with claim 1, wherein the second wireless link includes a first electronic device associated with the relay antenna, a second electronic device associated with the BTS station, and a wireless transmission channel connecting the first and second electronic devices.

4. The communications network in accordance with claim 3, wherein the first electronic device includes means for analog/digital conversion and the second electronic device includes means for digital/analog conversion.

5. The communications network in accordance with claim 4, wherein the first and second electronic devices include means for compressing a signal to be transmitted.

6. The communications network in accordance with claim 4, wherein
the relay antenna includes a multiband antenna, and
the first electronic device includes means for identifying a channel on which signals to be transmitted are received by the multiband antenna.

7. The communications network in accordance with claim 4, wherein the first electronic device includes means for verifying presence of a fixed radio frequency station functioning at a frequency at which signals to be transmitted are received by the relay antenna.

8. The communications network in accordance with claim 3, wherein the first and second electronic devices include means for compressing a signal to be transmitted.

9. The communications network in accordance with claim 8, wherein
the relay antenna includes a multiband antenna, and
the first electronic device includes means for identifying a channel on which signals to be transmitted are received by the multiband antenna.

10. The communications network in accordance with claim 8, wherein the first electronic device includes means for verifying presence of a fixed radio frequency station functioning at a frequency at which signals to be transmitted are received by the relay antenna.

11. The communications network in accordance with claim 3, wherein
the relay antenna includes a multiband antenna, and
the first electronic device includes means for identifying a channel on which signals to be transmitted are received by the multiband antenna.

12. The communications network in accordance with claim 11, wherein the first electronic device includes means for verifying presence of a fixed radio frequency station functioning at a frequency at which signals to be transmitted are received by the relay antenna.

13. The communications network in accordance with claim 3, wherein the first electronic device includes means for verifying presence of a BTS station functioning at a frequency at which signals to be transmitted are received by the relay antenna.

14. The communications network in accordance with claim 1, including a plurality of BTS stations, each BTS station functioning at a predetermined frequency and communicating with a multi-band antenna.

15. A communications network providing communication between mobile stations and stationary stations, the communications network comprising:
a plurality of Base Transceiver System (BTS) stations as the stationary stations;
a plurality of relay antennas, each relay antenna being dedicated to a respective BTS station and providing a respective first wireless link with some of the mobile stations and the BTS station to which the respective relay antenna is dedicated; and
a plurality of second wireless links, each second wireless link linking a respective relay antenna to the BTS station to which the respective relay antenna is dedicated, wherein
each second wireless link includes, at the respective relay antenna, a demodulator demodulating high frequency signals received at the relay antenna from the mobile stations, removing the carrier from the high frequency signals that are received at the relay antenna, and producing low frequency signals that are transmitted to the BTS station to which the relay antenna is dedicated, on the respective second wireless link.

16. The communications network in accordance with claim 15, wherein each of the second wireless links includes a first electronic device associated with the respective relay antenna dedicated to the respective BTS station, a second electronic device, associated with the respective BTS station to which the relay antenna is dedicated, and a wireless transmission channel connecting the first and second electronic devices.

17. The communications network in accordance with claim 16, wherein each of the first electronic devices includes means for analog/digital conversion and each of the second electronic devices includes means for digital/analog conversion.

18. The communications network in accordance with claim 16, wherein each of the first and second electronic devices includes means for compressing a signal to be transmitted.

19. The communications network in accordance with claim 16, wherein
each of the relay antennas includes a multiband antenna, and
each of the first electronic devices includes means for identifying a channel on which signals to be transmitted are received by the respective multiband antenna.

20. The communications network in accordance with claim 16, wherein each of the first electronic devices includes means for verifying presence of a BTS station functioning at a frequency at which signals to be transmitted are received by the relay antenna dedicated to the respective BTS station.

* * * * *